UNITED STATES PATENT OFFICE.

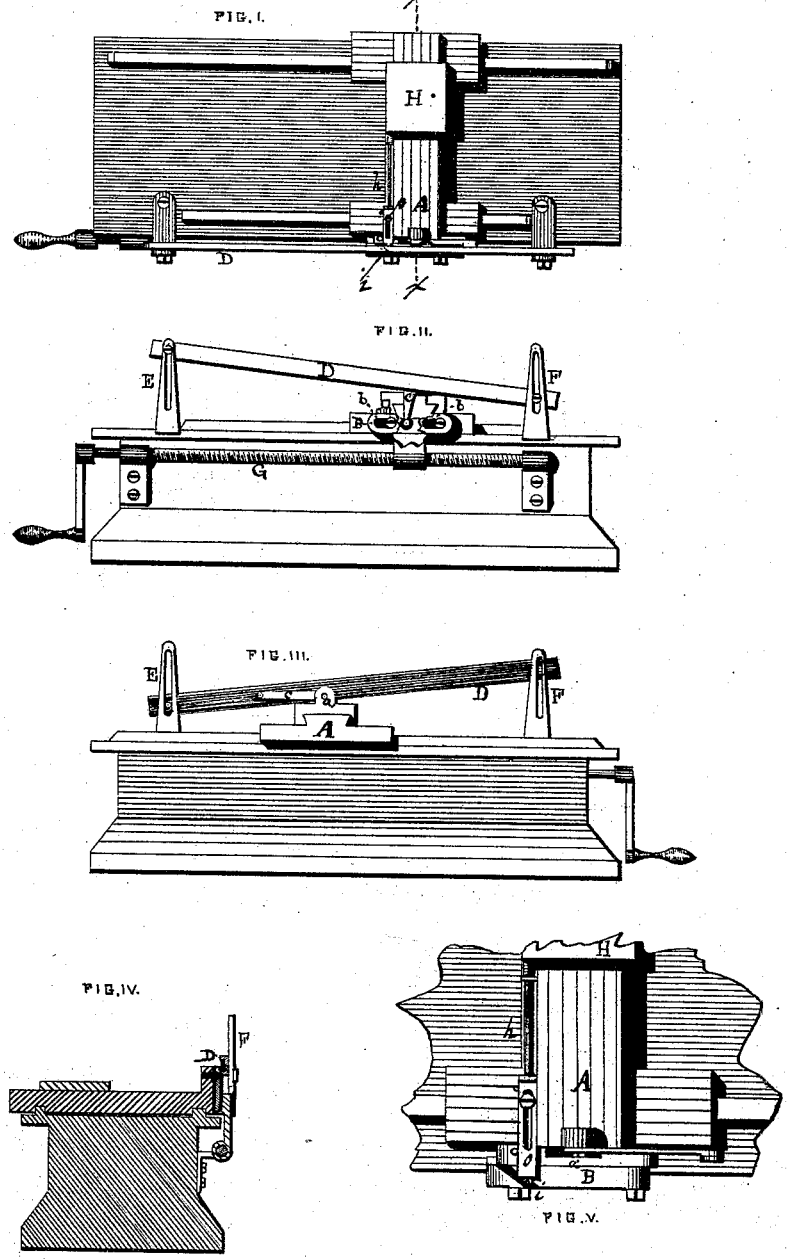

SALMON W. PUTNAM, JR., OF FITCHBURG, MASSACHUSETTS.

IMPROVEMENT IN METAL-TURNING LATHES.

Specification forming part of Letters Patent No. 177,884, dated May 23, 1876; application filed September 3, 1874.

*To all whom it may concern:*

Be it known that I, S. W. PUTNAM, Jr., of Fitchburg, county of Worcester and State of Massachusetts, have invented a new and Improved Engine and Screw-Cutting Lathe, of which the following is a full, clear, and exact description, reference being had to the accompanying drawings, making part of this specification, in which—

Figure 1 is a plan view. Fig. 2 is a side elevation. Fig. 3 is a side elevation on the opposite side from Fig. 2. Fig. 4 is a cross-section on the line *x x* of Fig. 1. Fig. 5 is a detail to be referred to.

In practice mechanics experience greater or less difficulty in making taps, dies, and screws to agree in their pitch or lead. This is often the case when taps are "chased" in a lathe, and afterward hardened and tempered, as there is always more or less variation occasioned by shrinkage or expansion; and a hole threaded with a tap made under such circumstances will not agree with a screw which has not undergone a like process, or which is made from a different material, although cut in the same machine.

In many cases it is necessary to cut screws in lathes aside from that in which the tap was made, but the same imperfections will generally be found, and often in a larger degree; and again it is frequently required to cut the same screw or screws in several lathes, and as the leading-screws of all lathes seldom agree, and are rarely perfect, their imperfections are readily comprehended even when the machines are new, and when worn their defects increased.

These mechanical defects are of universal existence, but more plainly met with on large taps and screws, and particularly those with square and United States standard threads.

As a partial remedy, screws with V-threads are generally cut smaller in diameter than should be, to fit properly, while in other cases these defective points are of such magnitude as to necessitate the imperfect and impracticable method of expanding or contracting the leading-screws of lathes, &c., by the application of heat or cold.

To overcome these defects, and at the same time have other advantages, is the object of my invention, which consists in mechanism for actuating the tool-carriage at a greater or lesser speed than that given by the leading-screw, and in an improved tapering attachment, as will be hereinafter more fully set forth.

In order that those skilled in the art may make and use my invention, I will proceed to describe the manner in which I have carried it out, reference being had to the accompanying drawings.

In the projection on the rear side of the carriage A, to which the leading-screw nut B is fixed, is a slot, corresponding to a tongue on nut B. This is fitted to allow a movement of the nut B on and independent of carriage A. The nut B has elongated slots, through which pass the screws or bolts to secure it to carriage A. A portion of tongue on nut B is cut away to allow the entrance of one end of the lever C. The lever C is pivoted to carriage A in such a manner as to produce a longitudinal motion of carriage A when a vertical pressure is applied to the roller on the arm of lever C. The guiding-bar D has a groove extending along its front side, corresponding in width to the diameter of roller on lever C. The guiding-bar D is held in position by upright standards E and F, which have elongated slots to permit of a variation in the angle of the bar D, and when a desired angle has been obtained, the bar D is secured to standards E and F by bolts or screws. The standards E and F are designed to be clamped to the lathe-bed, so as to permit of lateral adjustment when required.

It is now obvious that when the guiding-bar D is in a horizontal line with the lathe-bed, and motion be imparted to the leading-screw G, the movement of carriage A will be the same as on the ordinary lathe; but if the bar D is elevated or depressed from the horizontal line the carriage A will move at a corresponding greater or less velocity than the pitch of the leading-screw G.

From the movements obtained in the attachments already described, and with the addition of the cam or its equivalent, and the adjustable reciprocating cross-rod, (attached to saddle H, which carries the cutting-tool,) I am enabled by the adjustment of the bar D to turn work on any desired taper without setting over the centers of the lathe. This latter arrangement is, of course, disconnected, and not used when cutting screw-threads.

When it is required, the leading-screw nut B should be made in halves, or, in other words, to open and shut, in order to release screw G. The driving-power to carriage A is then derived from a rack and pinion or another screw on its front side. When the saddle H on carriage A is not connected to the adjustable rod it will be controlled by a cross-screw on its front side.

Having thus described my invention, what I claim as new, and desire to secure by Letters Patent, is—

1. The carriage A and nut B, capable of being moved at different speeds, in combination with the tapering attachment, consisting of the rod $h$ and loop $o$, substantially as set forth.

2. The guide-bar D and bent lever C, pivoted at the angle $a$ to the carriage, and the end inserted in the nut B, in combination with the nut B, provided with slots $b\ b$, and the screw G, as set forth.

3. In a taper attachment for lathes, the saddle H, in combination with the reciprocating cross-rod $h$ and diagonal groove $i$ in the nut B, substantially as described, and for the purpose set forth.

SALMON W. PUTNAM, JR.

Witnesses:
H. J. HARRINGTON,
HENRY O. PUTNAM.